（12） United States Patent
Chuang

(10) Patent No.: US 7,298,742 B2
(45) Date of Patent: Nov. 20, 2007

(54) NETWORK ADDRESS CONVERSION SYSTEM AND THE METHOD THEREOF

(75) Inventor: Chenming Chuang, Chung-Ho (TW)

(73) Assignee: Leadtek Research Inc., Taipei Hsien (TW)

( * ) Notice: Subject to any disclaimer, the term of this patent is extended or adjusted under 35 U.S.C. 154(b) by 921 days.

(21) Appl. No.: 10/444,273

(22) Filed: May 23, 2003

(65) Prior Publication Data

US 2004/0017818 A1    Jan. 29, 2004

(30) Foreign Application Priority Data

Jul. 25, 2002    (TW) .............................. 91116678 A

(51) Int. Cl.
*H04L 12/28* (2006.01)
(52) U.S. Cl. ....................... 370/389; 370/475
(58) Field of Classification Search .................... None
See application file for complete search history.

(56) References Cited

U.S. PATENT DOCUMENTS 6,944,167 B1 * 9/2005 McPherson ................. 370/401
7,139,841 B1 * 11/2006 Somasundaram et al. ... 370/392
2002/0042832 A1 * 4/2002 Fallentine et al. .......... 709/230
2003/0065785 A1 * 4/2003 Jain ........................... 709/227
2004/0028035 A1 * 2/2004 Read .......................... 370/352
2004/0037268 A1 * 2/2004 Read .......................... 370/352
2004/0210672 A1 * 10/2004 Pulleyn et al. .............. 709/245

* cited by examiner

*Primary Examiner*—Chi Pham
*Assistant Examiner*—Anh-Vu Ly
(74) *Attorney, Agent, or Firm*—Seyfarth Shaw LLP

(57) ABSTRACT

The present invention discloses a network address conversion system and the method thereof, which applies to products of VoIP and is compliant with Q.931 and H.245 protocols used by the videophone. The network address conversion system according to the present invention comprises a private network, a public network, a NAT router and a network server. The NAT router is used to convert the private IP address of the data packet from the private network into a public IP address for entering the public network, and to convert the public IP address of the data packet from the public network into a private IP address for entering the private network. The network server is connected to the public network to execute a public IP address query program, and then transmits the public IP address back to the node in the private network.

10 Claims, 5 Drawing Sheets

NETWORK ADDRESS CONVERSION SYSTEM AND THE METHOD THEREOF

BACKGROUND OF THE INVENTION

1. Field of the Invention

The present invention relates to a network address conversion system and the method thereof, more particularly to a system using a network server for performing network address conversion and the method thereof.

2. Background of the Invention

In order to solve the problem of increasingly insufficient public IP addresses, RFC1918 defines three domains for private IP addresses, 10.0.0.0 to 10.255.255.255, 172.16.0.0 to 172.31.255.255, and 192.168.0.0 to 192.168.255.255, respectively. The private IP addresses may be used to connect computers in an enterprise in view of not needing to additionally apply for more public IP addresses. However, because a plurality of private IP addresses will be converted into the same public IP address when they connect to the external public network, the object of saving IP addresses needs to be achieved. Nevertheless, because the plurality of private IP addresses share the same public IP address, the data packets should be performed in an IP address conversion through a router between the public network and the private network within an enterprise.

A common conversion method between the private IP address and the public IP address is the Network Address Translation (NAT) defined by RFC1631. The conventional network address conversion system 10, as shown in FIG. 1, uses a NAT router 12 to convert the source address included in the IP header of the data packet from the private network 11 into the public IP address of the public network 13, and convert the source address included in the IP header of the data packet from the public network 13 into the private IP address of the private network 11. For example, a node in a private network 11 having a private IP address of 192.168.1.1 can be converted to a public IP address 202.132.2.2 through a routing table of the NAT router 12, and then communicate with a remote node in the public network 13.

For the application of transmitting high quality voice over IP (VoIP), such as the Q.931 and H.245 protocols used by the videophone, the Information of IP address in the IP header is not only included in the data packet, but also in the payload. However, the conventional NAT router 12 only handles the convertion of the private IP address in the IP header into a public IP address, and not the IP address conversion in the payload. Because the IP address in the payload has not been converted, the user of the videophone in the public network 13 cannot transmit his voice and image to the user of the videophone in the private network 11.

A conventional method for solving the above problem is to add A/P gateways 21 and 22 at both ends of the NAT router 12 in cooperation with the system service provider, as shown in FIG. 2, which is responsible for the IP address conversion in the payload. However, this method increases the cost burden of the manufacturing company. For individual users, because there are no system service providers that cooperates the A/P gateways 21 and 22, the above-mentioned solution cannot be used. Another solution is to use a specific NAT router having the function of converting the IP address in the payload, but this also results in high cost burden, which is difficult to be accepted in the market. Moreover, when using ADSL or cable modem, the public IP address dynamically changes, and is not fixed, so the difficulty of the design increases.

As described above, because the current VoIP applications in the market are concerned practical requirements of the user, effectively completing the communication and reducing the cost becomes very important issues.

SUMMARY OF THE INVENTION

The main object of the present invention is to provide a network address conversion system and the method thereof, which can make the VoIP product application compliant with the Q.931 and H.245 protocols.

The second object of the present invention is to provide a network address conversion system and the method thereof, which does not need to further increase expensive hardware equipments and setup complicated configuration.

To this end, the network address conversion system according to the present invention comprises a private network, a public network, a NAT router and a network server. The NAT router is used to convert the private IP address of the data packet from the private network into a public IP address for entering the public network, and to convert the public IP address of the data packet from the public network into a private IP address for entering the private network. The network server is connected to the public network to execute a public IP address query program, and then transmits the public IP address back to the node in the private network.

The network address conversion method according to the present invention includes steps (a) to (c). In step (a), a node in the private network is connected to a network server through a NAT router. In step (b), the network server executes a public IP address query program. In step (c), the network server transmits the public IP address back to the node in the private network.

The network address conversion system according to the present invention and the method thereof can provide at least the following advantages:

1. The user need not further purchase an expensive A/P gateway or NAT router with special application.
2. Solves the design difficulties for the ADSL or cable modem resulting from the dynamic change of the public IP address.
3. Simple and easy to use, without any complicated configuration setup.

BRIEF DESCRIPTION OF THE DRAWINGS

The present invention will be described according to the appended drawings in which.

PREFERRED EMBODIMENT OF THE PRESENT INVENTION

Figure 1:
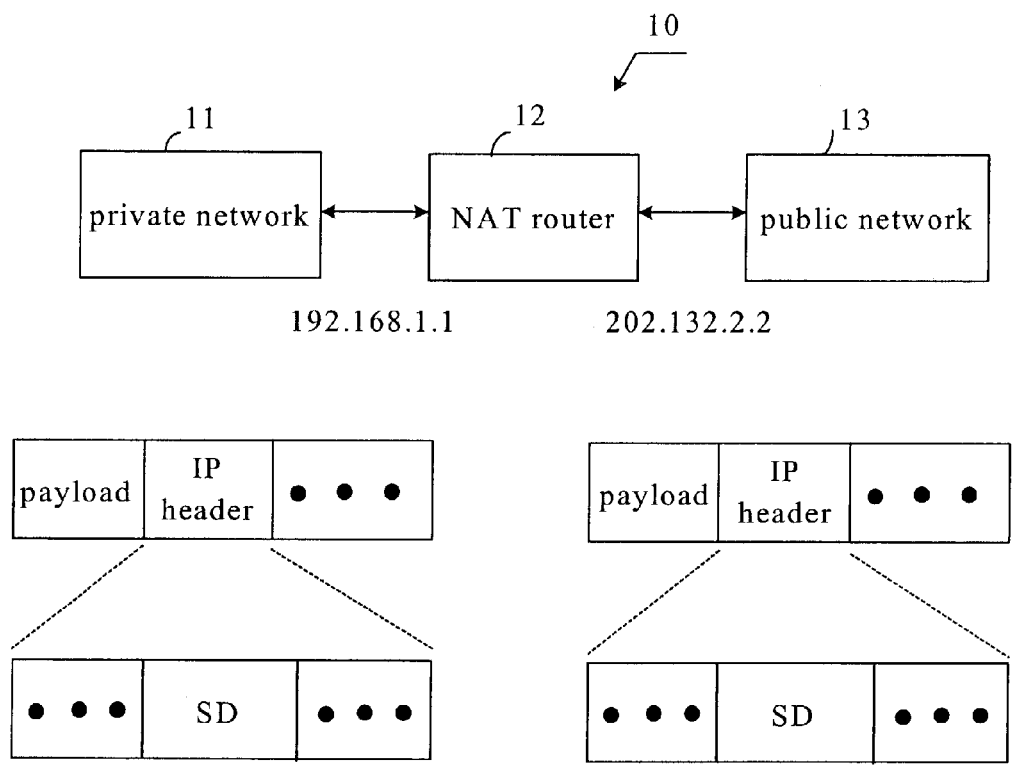
FIG. 1 shows a conventional network address conversion system.
Figure 2:
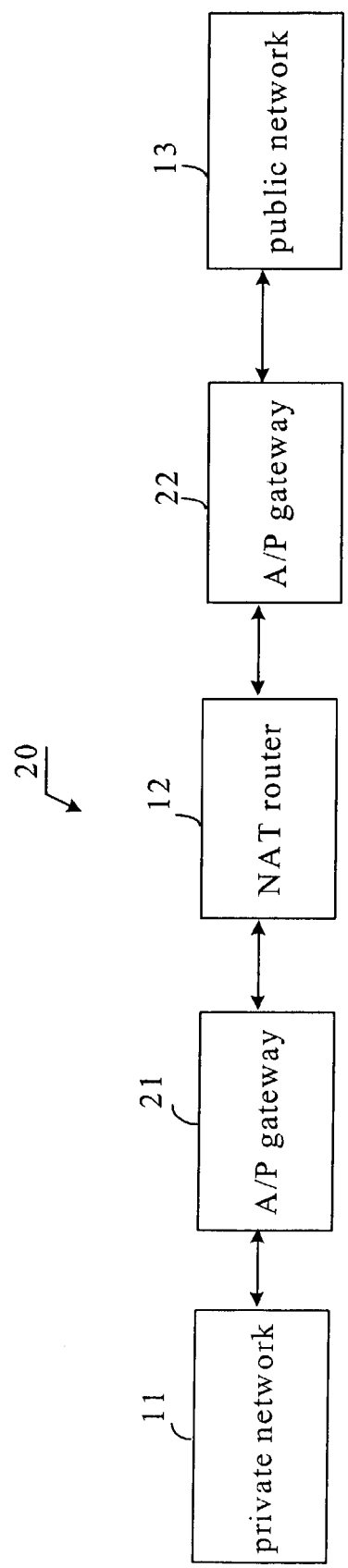
FIG. 2 shows another conventional network address conversion system.
Figure 3:
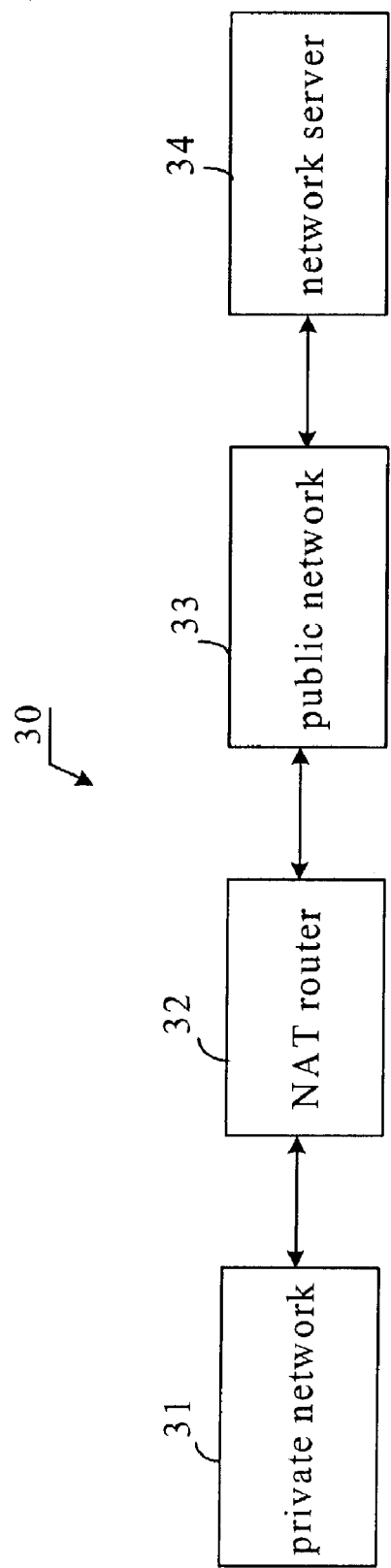
FIG. 3 shows a structural view of the network address conversion system according to the present invention.

FIG. 3 is a structural view of the network address conversion system according to the present invention. The network address conversion system 30 according to the present invention adds a network server 34 at one end of the public network 33 which has a specific public IP address and accepts the user's query through a special I/O port.

Figure 4:
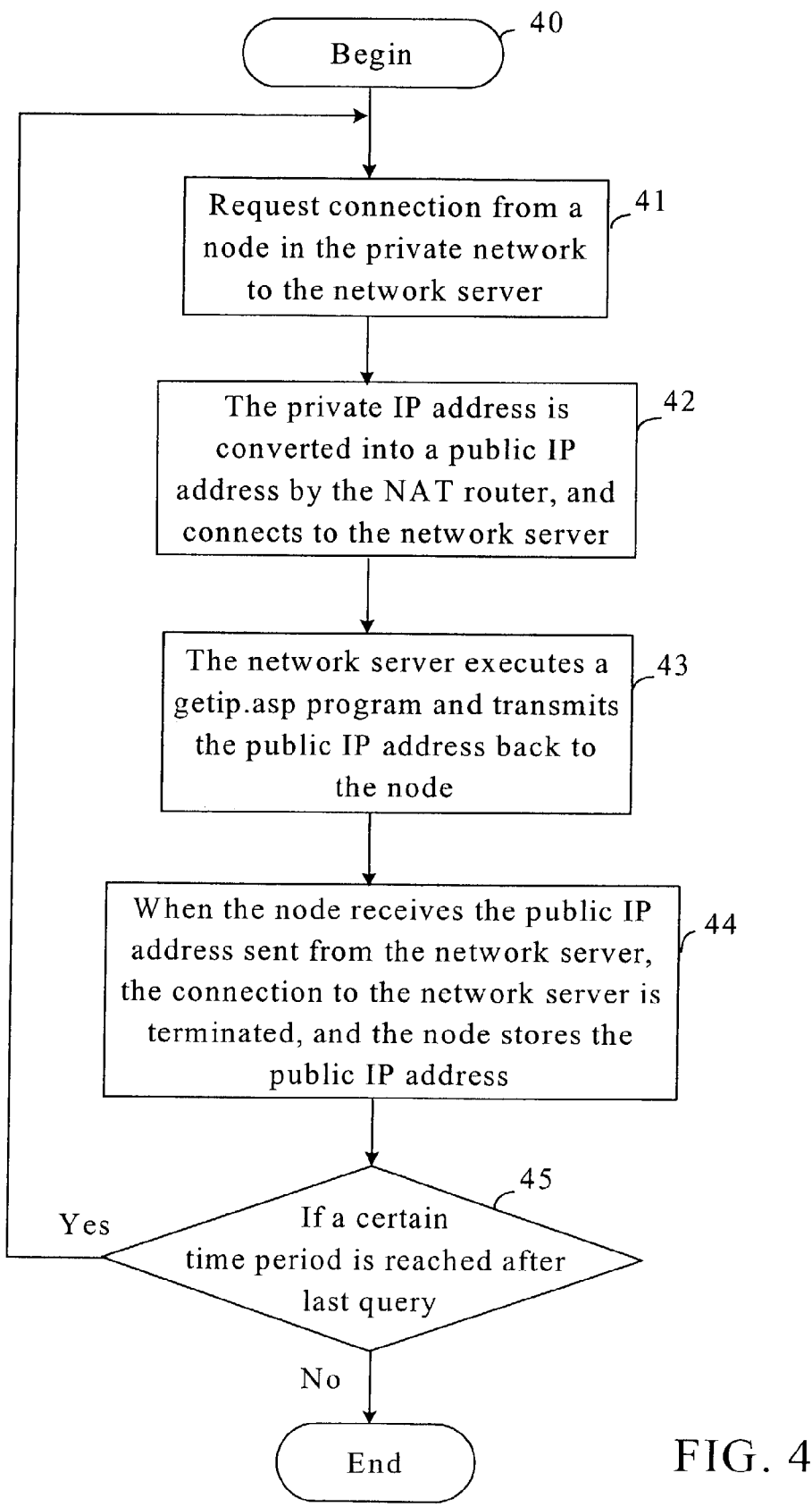
FIG. 4 shows a network address conversion method according to the present invention.

The network address conversion method according to the present invention is described in the flowchart of FIG. 4.

STEP 41: A data packet is sent to request connection from a node (representing the user) in the private network 31 to the network server 34.

STEP 42: The private IP address in the IP header of the data packet is converted into a public IP address by the NAT router 32, and connects to the I/O port of the network server 34.

STEP 43: The network server 34 executes a getip.asp program, and transmits the public IP address back to the node.

STEP 44: When the node receives the public IP address sent from the network server 34, the connection to the network server 34 is terminated, and then the node stores the public IP address.

STEP 45: In compliance with the characteristic of periodically changing the public IP address in ADSL or DHCP connections, the operation for querying the public IP address will be processed once within a certain time period, such as 5 minutes, so as to prevent disconnection during transmission causing the defect of poor communication.

Figure 5:
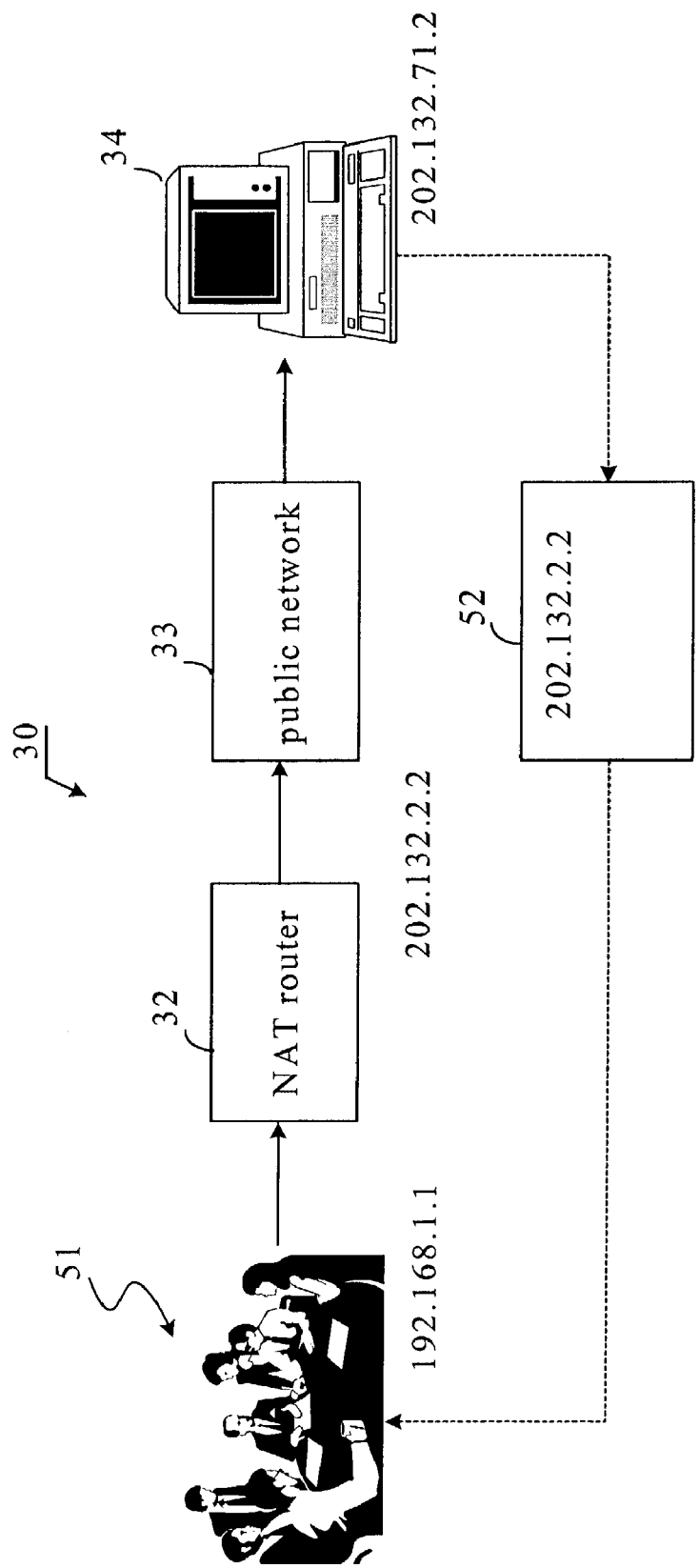
FIG. 5 shows an embodiment of the network address conversion method according to the present invention.

FIG. 5 is an embodiment of the network address conversion method according to the present invention. For example, a node 51 in the private network 31 has a private address 192.168.1.1, and uses a videophone for video conferencing. In addition, the IP address of the network server 34 is 202.132.71.2, and accepts the query for the public IP address by the user through a specific I/O port. First, the node 51 accesses http://202.132.71.2/getip.asp to transmit the data packet for querying the public IP address to the network server 34. The NAT router 32 converts the private IP address 192.168.1.1 in the IP header of the data packet into a public IP address 202.132.2.2, and connects to the I/O port on the network server 34. The network server 34 executes the getip.asp program, and transmits the public IP address 202.132.2.2 back to the node 51 in HTML format 52. When the node 51 receives the public IP address sent by the network server 34, it will parse the HTML format 52, store the public IP address, and terminate the connection to the network server 34. After that, the videophone at the node 51 will add the public IP address into the payload during data packet transmission each time, in order to be compliant with the Q.931 and H.245 protocols. Furthermore, in compliance with the characteristic of periodically changing the public IP address in ADSL or DHCP connections, the operation for querying the public IP address will be processed once within a certain time period, such as 5 minutes, by the videophone at the node 51, so as to prevent disconnection during the transmission causing the defect of poor communication.

The above-described embodiments of the present invention are intended to be illustrative only. Numerous alternative embodiments may be devised by those skilled in the art without departing from the scope of the following claims.

What is claimed is:

1. A network address conversion system, comprising:
   a private network;
   a public network;
   a Network Address Translation (NAT) router for converting private IP addresses of data packets from the private network into public IP addresses entering the public network and converting public IP addresses of data packets from the public network into private IP addresses entering the private network; and
   a network server connected to the public network for executing a public IP address query program, wherein the public IP address query program does not need nodes in the private network to be registered in the network server.

2. The network address conversion system of claim 1, wherein the network server connects to the public network through a special Input/Output (I/O) port.

3. The network address conversion system of claim 1, wherein the network server executes a getip.asp program and transmits the public IP addresses back in Hyper Text Markup Language format.

4. A network address conversion method, comprising the steps of:
   connecting a node in a private network to a network server through a Network Address Translation (NAT) router;
   executing a public IP address query program by the network server; and
   transmitting a public IP address to the node in the private network by the network server, wherein the public IP address query program does not need nodes in the private network to be registered in the network server.

5. The network address conversion method of claim 4, wherein the node of the private network queries the public IP address once within a time period.

6. The network address conversion method of claim 4, wherein the network server executes a getip.asp program and transmits the public IP addresses back in Hyper Text Markup Language format.

7. The network address conversion method of claim 4, wherein the node of the private network performs a VoIP application.

8. The network address conversion method of claim 4, wherein the node of the private network performs a videophone application.

9. The network address conversion method of claim 4, wherein the public IP address received by the node of the private network is stored in payloads of data packets.

10. The network address conversion method of claim 4, wherein the network server connects to a public network through a special Input/Output (I/O) port.

* * * * *